United States Patent
Jones et al.

(10) Patent No.: US 6,714,866 B2
(45) Date of Patent: Mar. 30, 2004

(54) METHODS AND APPARATUS FOR INSTALLATION ALIGNMENT OF EQUIPMENT

(75) Inventors: Ralph R. Jones, Blaine, MN (US); Douglas M. Weed, Forest Lake, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/179,148

(22) Filed: Jun. 24, 2002

(65) Prior Publication Data
US 2003/0182059 A1 Sep. 25, 2003

Related U.S. Application Data
(60) Provisional application No. 60/366,383, filed on Mar. 21, 2002.

(51) Int. Cl.$^7$ ............................................... G01C 21/26
(52) U.S. Cl. ................ 701/220; 701/206; 701/207; 701/3; 701/6; 303/140; 244/3.2
(58) Field of Search .................. 701/206, 207, 701/220, 225, 3, 6; 340/429; 303/140, 146; 244/3.2, 177

(56) References Cited
U.S. PATENT DOCUMENTS

| | | | |
|---|---|---|---|
| 4,488,249 A | 12/1984 | Baker | |
| 4,562,978 A | 1/1986 | Durbin et al. | |
| 5,031,330 A | 7/1991 | Stuart | |
| 5,360,236 A | 11/1994 | Brown | |
| 5,421,187 A | 6/1995 | Morgan | |
| 5,483,455 A | * 1/1996 | Lay et al. | 701/206 |
| 5,751,578 A | 5/1998 | Quinn et al. | |
| 5,948,045 A | 9/1999 | Reiner | |

* cited by examiner

Primary Examiner—Gertrude Arthur
(74) Attorney, Agent, or Firm—Matthew Luxton, Esq.; Armstrong Teasdale LLP

(57) ABSTRACT

A method for installation alignment of an inertial reference unit (IRU) with vehicle axes when the IRU is installed within the vehicle is provided. The vehicle axes include roll, pitch, and yaw axes. The method includes recording vehicle angular position data including roll and pitch, using an angular position measurement device with the vehicle being in a starting position, recording IRU data including roll and pitch, receiving measured nose plunge data, computing initial roll and pitch misalignment corrections, applying initial roll and pitch misalignment corrections to measured nose plunge data. A nose plunge yaw misalignment is determined using corrected nose plunge data and utilized to adjust the assumed heading reference.

24 Claims, 4 Drawing Sheets

$\delta\phi$ = roll misalignment
$\delta\theta$ = pitch misalignment
$\delta\psi$ = yaw misalignment

METHODS AND APPARATUS FOR INSTALLATION ALIGNMENT OF EQUIPMENT

CROSS REFERENCE TO RELATED APPLICATIONS

This application claims the benefit of U.S. Provisional Application No. 60/366,383, filed Mar. 21, 2002.

BACKGROUND OF THE INVENTION

This invention relates generally to aircraft navigation, and more specifically, to installation of inertial navigation and attitude measuring devices within vehicles such as aircraft, or any other system utilizing an attitude measuring device.

When an attitude measuring or inertial measurement device, for example, an Attitude Heading Reference System (AHRS), Inertial Reference System (IRS), or Inertial Measurement Unit (IMU) is installed in a vehicle there is the need to accurately determine and correct for a physical misalignment between the actual installation alignment and the desired installation alignment, which is typically along the axes of a vehicle. Such measuring and measurement devices are collectively referred to herein as inertial reference units, or IRUs. Typically, a difference between actual and desired installation alignment is further complicated since the IRUs typically are mounted on a fixture, or jig, which is mounted to the vehicle. The jig installation alignment therefore introduces an additional source of installation error. In addition, different vehicles, for example, different aircraft, are designed such that IRUs are mounted in each aircraft in a different orientation compared to the mounting orientation in other aircraft. Therefore, different alignment methods are needed for each mounting orientation in order to provide accurate attitude (roll, pitch, and heading) information.

The desired IRU installation alignment is typically with respect to the vehicle principle axes. Typically, the principle axes for an aircraft (illustrated in FIG. 1) are defined to be out of the nose, right wing, and down. The misalignment between the installed device and the vehicle principle axes can be determined in several ways, depending on available equipment, tools, and reference information.

One method for aligning an IRU with the vehicle axes is often referred to as a manual alignment method. The manual alignment method requires that the vehicle be leveled along its principle axes, for example, the roll and pitch axes, and further requires an external heading reference point. One type of external heading reference point is referred to as a compass rose, which provides known heading references. The vehicle is aligned, while level, with the compass rose at one of the known headings. Tools are used, for example, a plumb-bob or a laser device, to ensure that the vehicle is accurately aligned with the compass rose. The IRU readings are then compensated, typically by coefficients in a memory, so that the measured vehicle attitude (roll, pitch, and yaw) agrees with the external reference heading and the vehicle level condition.

Another method of aligning the aircraft and the IRUs is generally referred to as a transfer alignment. In the transfer alignment method, the vehicle is considered to have a "truth spot", providing a truth reference with an accompanying reference jig. The reference jig has a reference IRU mounted upon it, and as certain vehicles have more than one installed IRU, the reference IRU is moved to and from the multiple mounting locations. This method includes procedures for compensation in alignment measurement differences received as the reference IRU is moved from a first mounting location (i.e. the "truth spot") to other mounting locations.

Another alignment method currently used is often referred to as nose plunge. The known nose plunge method has a prerequisite of physically leveling the vehicle in the principle axes and then physically or electronically adjusting the installed device until it also indicates level. Once the device and the aircraft both indicate level, the aircraft is then rotated about one of the principle axes that is now level, for example, pitch, so as to determine the misalignment about a vertical axis, which is sometimes referred to as a yaw misalignment.

The existing nose plunge method only produces a yaw misalignment correction since this method requires that the IRU being used to collect the roll and pitch measurements first be corrected, that is provide compensated readings, in the level (roll and pitch) axes. Compensation is one of an electronic compensation, for example, in a memory, or a physical installation of shims to compensate for misalignment with the principle axes. The compensation encompasses an additional installation method to be performed before the yaw misalignment can be determined via nose plunge.

The three alignment methods described above include drawbacks. At least two drawbacks are the reliance on the aircraft being nearly level in two axes, and the need for external equipment and facilities. Such equipment and facility examples include, the compass rose (or an equivalent) and the reference jig and IRU. However, such equipment and facilities are not common at all aircraft construction and maintenance facilities where an IRU may be installed or replaced.

BRIEF SUMMARY OF THE INVENTION

In one aspect, a method for installation alignment of an inertial reference unit (IRU) with vehicle axes, the vehicle axes including roll, pitch, and yaw axes, is provided. The provided method comprises recording vehicle angular position data, including roll and pitch, using an angular position measurement device, the vehicle being in a starting position. The method also comprises recording IRU data, including roll and pitch, assuming a heading reference value, the assumed value to be included with both the vehicle angular position data and the recorded IRU data, and receiving measured nose plunge data. The method continues as initial roll and pitch misalignment corrections are computed, initial roll and pitch misalignment corrections are applied to measured nose plunge data, and a nose plunge yaw misalignment is determined using the measured nose plunge data to adjust the assumed heading reference.

In another aspect, an apparatus configured for installation alignment of an inertial reference unit (IRU) with vehicle roll, pitch, and yaw axes is provided. The apparatus comprises a vehicle angular position measurement device and a computer which is configured to be coupled to the angular position measurement device and the IRU. The computer is configured to record a condition of the vehicle in the roll and pitch axes, the vehicle being in a starting position, through roll and pitch readings received from said angular position measurement device. The computer is also configured to record IRU data including roll and pitch received from the IRU at the starting position, assume a single heading value for both said angular position measurement device data and the IRU data, record IRU data including roll, pitch, and heading received from the IRU at multiple nose plunge positions, and compute initial roll and pitch misalignment corrections. The computer further applies initial roll and pitch misalignment corrections to data received from the IRU at the multiple nose plunge positions, and determines a nose plunge yaw misalignment using the IRU data from the multiple nose plunge positions to adjust the heading value.

DETAILED DESCRIPTION OF THE INVENTION

Herein described are methods and apparatus which improve upon existing "nose plunge" methods by determining both level and vertical misalignments of inertial navigation and attitude measuring devices, herein described as IRUs. The improved methods will be referred to herein as an uncompensated nose plunge procedure. The uncompensated nose plunge procedure does not require the vehicle to be level in the other two axes while rotating about a principle axis. The uncompensated nose plunge procedure therefore provides simplification over known procedures for IRU device installations and alignments. In addition, a need to precisely position the vehicle to align the IRU devices is removed. The uncompensated nose plunge procedure is a method for determining yaw misalignment via nose plunge without having to previously compensate for roll and pitch misalignment. The end result is an iterative computation of all three misalignment angles, which are then used to make electronic or physical alignment adjustments.

Although described herein in the context of attitude measuring devices for an aircraft or a vehicle, it is to be understood that the methods and apparatus described herein are considered to be applicable to any type of system which incorporates or could incorporate an attitude measuring device.

Figure 1:
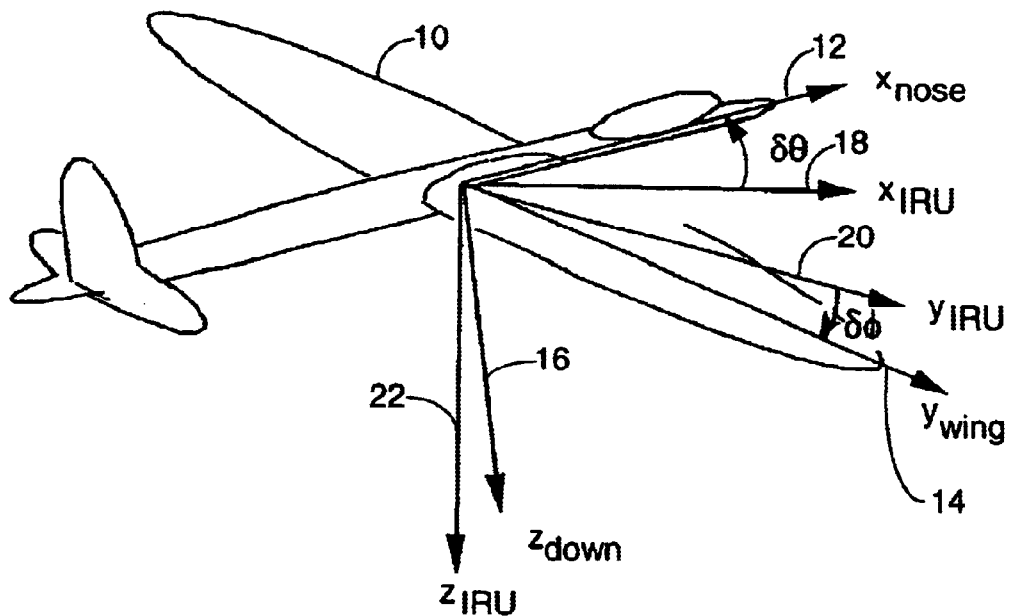
FIG. 1 is a top view of an aircraft which illustrates aircraft axes and axes as measured by a misaligned IRU.
Figure 1:
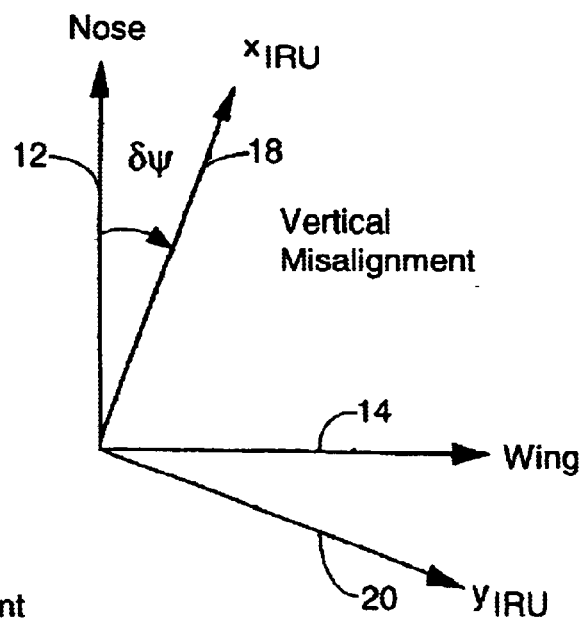

FIG. 1 is a top view of an aircraft 10, and illustrates aircraft axes 12, 14, and 16, and axes 18, 20, and 22 as measured by a misaligned IRU. FIG. 1 serves to illustrate the problem of misaligned IRUs, since it is easy to imagine how such errors in roll, pitch, and heading measurements can operate to cause aircraft 10 or any other vehicle which utilizes attitude data, to stray off a desired course. FIG. 1 illustrates roll and pitch misalignments at aircraft 10. Further illustrated is a vertical, or yaw misalignment.

Figure 2:
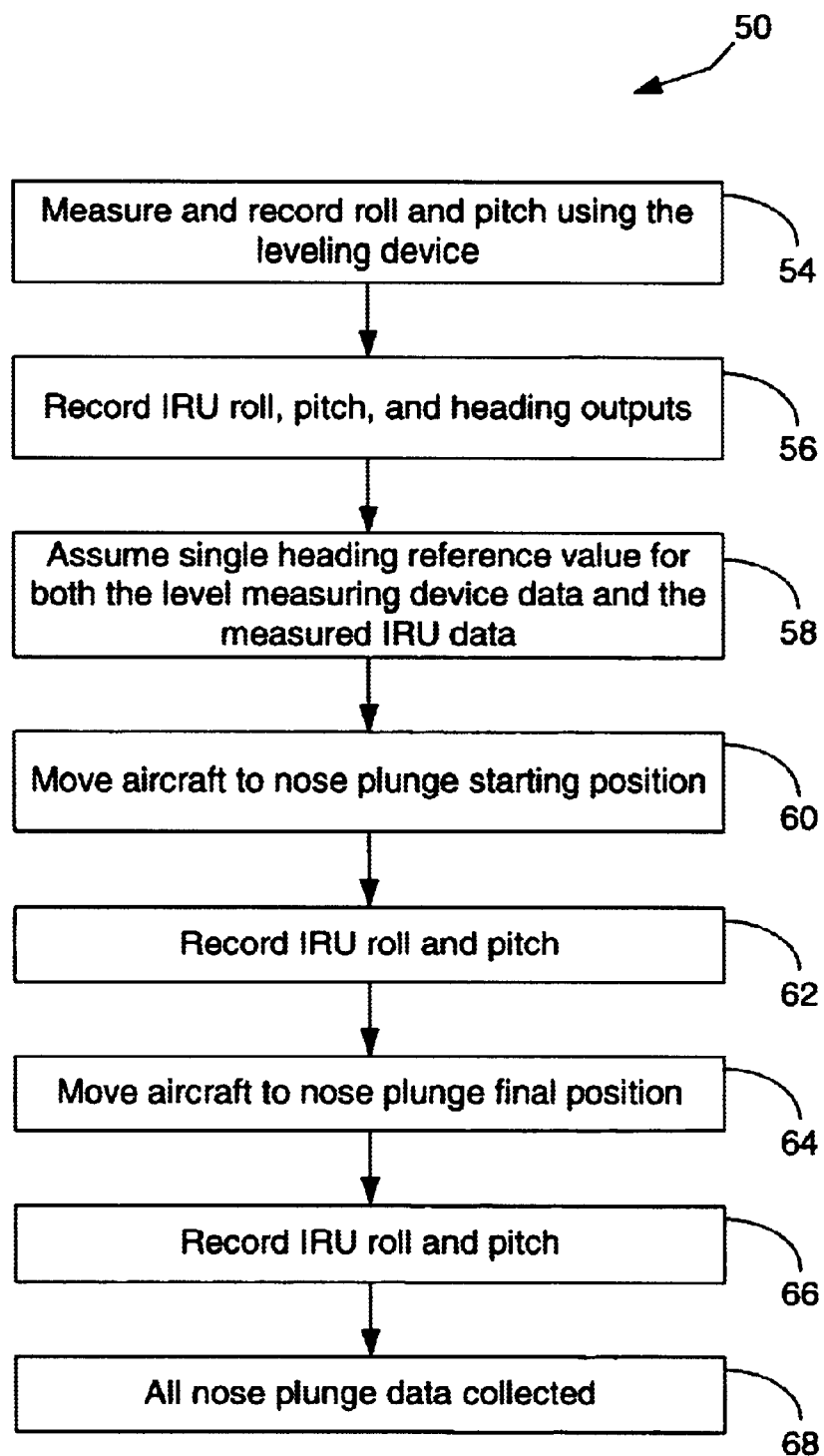
FIG. 2 is a flowchart illustrating a nose plunge data collection method.

FIG. 2 illustrates a method 50 of collecting uncompensated nose plunge data for installation alignment of IRUs in vehicles. A vehicle roll and pitch is measured and recorded 54 utilizing an angular position measurement device, the vehicle being in a starting position. An IRU roll, pitch, and heading output is also recorded 56 while the vehicle is in the same roll and pitch condition, that is, the starting position, which is sometimes referred to herein as a vehicle starting condition. A single heading reference value is assumed 58 for both the angular position measurement device data and the measured IRU data, which allows a zero yaw misalignment to be assumed, as further described below with respect to FIG. 3.

The vehicle is then rotated 60 about a principle vehicle axis, to a nose plunge first position, and an IRU measurement of the roll and pitch is recorded 62. Rotation 60 could be about either of a longitudinal axis or a lateral axis. The vehicle is then rotated 64 about the same principle vehicle axis, to a nose plunge second position, and an IRU measurement of the roll and pitch is recorded 66. Again, some or all of these IRU measurements may or may not be the same as the IRU measurements recorded during the vehicle starting condition. Therefore, the vehicle starting condition IRU measurements and the IRU measurements made at the first and second nose plunge positions are both time and order independent. At this point all nose plunge data has been collected 68. It is to be appreciated that the IRU measurements recorded when the vehicle is in a nose plunge position may or may not be the same as the IRU measurements recorded during at the starting position since the starting position of the vehicle, may or may not be the same vehicle position as any of the nose plunge positions.

Figure 3:
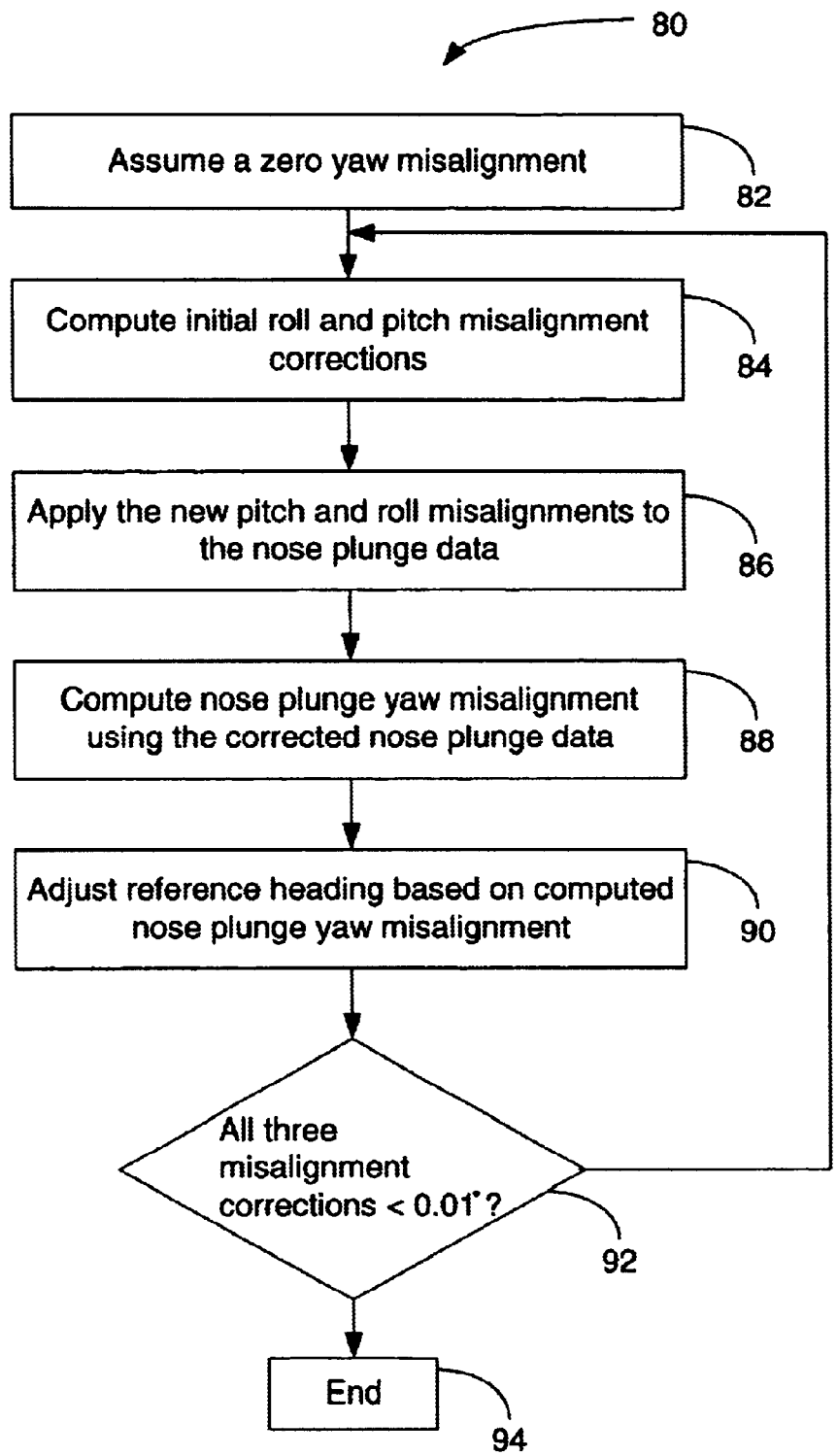
FIG. 3 is a flowchart illustrating a misalignment correction method which utilizes the nose plunge data collected in the method of FIG. 2.

Referring to FIG. 3, a method 80 of correcting misalignment errors in the three axes, roll, pitch, and yaw, using measured nose plunge data is illustrated. A zero yaw misalignment is assumed 82. The assumption allows initial roll and pitch misalignment corrections, which are slightly erroneous, to be computed 84 according to the misalignment equation $DCM_{VEHICLE}^{DEVICE} = DCM^{DEVICE} (DCM^{VEHICLE})^{-1}$, where DCM is a direction cosine matrix created from a set of Euler angles. A device Euler angle set to create $DCM^{DEVICE}$, is the IRU read out during the-vehicle starting condition and a vehicle Euler angle set to create $DCM^{VEHICLE}$, is the angular position measurement device measurement made at the vehicle starting condition. The vehicle heading reference from the measurement device is initially set to, for example, the device heading from the IRU. The device and vehicle Euler angle sets are relative to a same reference frame, for example, a local level frame. Otherwise an adjustment is performed to transform the angle sets into the same reference frame. A vehicle to device Euler angle set taken from $DCM_{VEHICLE}^{DEVICE}$, is a set of three desired installation misalignment corrections, roll, pitch, and yaw.

Initial roll and pitch misalignment corrections are applied 86 to the nose plunge data. Installation alignment correction, in one embodiment, includes applying 86 initial misalignment corrections mathematically, to the IRU measurements both before and after rotation of the vehicle about an axis. Application of the initial misalignment corrections, or measurement corrections are done, in one embodiment, according to measurement correction equations $DCM^{NEW1} = (DCM^{MA})^{-1} \times DCM^{OLD1}$ and $DCM^{NEW2} = (DCM^{MA})^{-1} \times DCM^{OLD2}$, where DCM is a direction cosine matrix created from a set of Euler angles.

The Euler angle set OLD1 is $(\phi_1, \theta_1, 0)$, which are the IRU measurements at the first nose plunge position with the yaw angle set to zero. The Euler angle set OLD2 is $(\phi_2, \theta_2, 0)$, are the IRU measurements at the second nose plunge position also with the yaw angle set to zero. The Euler angle set MA is $(\phi_{MA}, \theta_{MA}, 0)$, which are estimated roll and pitch misalignment corrections, and are the same in both equations above. Euler angle set NEW1 and NEW2 are the corrected nose plunge measurements to be used, a new heading angle provided in each of these Euler angle sets is ignored.

As stated above, the roll and pitch misalignments are applied 86 to the nose plunge data, providing corrected nose plunge data, and a nose plunge yaw misalignment is computed 88 using the corrected nose plunge data. Nose plunge yaw misalignment is computed 88, in one embodiment, according to $\Delta\Psi = \tan^{-1}\{(\cos\theta_2\sin\phi_2 - \cos\theta_1\sin\phi_1)/(\sin\theta_2 - \sin\theta_1)\}$ which produces a new yaw misalignment. Referring to the above equation, $\Delta\Psi$ is a computed vehicle to IRU yaw misalignment angle, $\theta_1$ is a measured initial IRU pitch angle, $\theta_2$ is a measured final IRU pitch angle, $\phi_1$ is a measured initial IRU roll angle, and $\phi_2$ is a measured final IRU roll angle. The reference heading is adjusted 90 based on the computed nose plunge yaw misalignment.

Misalignment corrections are checked 92, in one embodiment, to determine if the corrections in roll, pitch, and yaw have all changed by less than 0.01° between successive iterations. If all correction changes are less than 0.01°, method 80 ends 94. If any of the correction changes are more than 0.01°, steps 84 through 90 are repeated. The new roll and pitch corrections are applied to the same measurement correction equations. The computational iteration continues until the change in all three of the computed misalignment corrections is acceptable for a particular application.

To summarize the iteration, computed misalignment corrections are applied (mathematically) to the nose plunge measurements. The nose plunge equation will then produce a new yaw misalignment that is used to adjust the assumed heading reference that was used in the misalignment equation. The misalignment equation then uses this adjusted heading reference to produce a new set of roll, pitch, and yaw misalignment corrections. The new roll and pitch misalignment corrections are applied to the same nose plunge measurements already collected to produce another yaw misalignment correction, which again adjusts the assumed reference heading and the misalignment equation results. This computational iteration between nose plunge and the misalignment equation continues until the change in all three of the computed Euler angles is minimal, for example, <0.01°. It is important to note that starting condition data and, nose plunge data is only collected one time.

In the embodiment above described, the vehicle is physically rotated such that the nose of the vehicle is pitched up and/or down. Pitching the nose up or down is a matter of convenience, since certain vehicles, for example aircraft, are equipped with wing jack points that provide a pitch rotation axis. In another embodiment, the vehicle is rotated about the longitudinal, or roll axis (nose/tail), and the installation alignment methods herein described provide similar results. In both embodiments, yaw misalignment is determinable without having to separately determine and compensate installation misalignments for roll and pitch.

Figure 4:
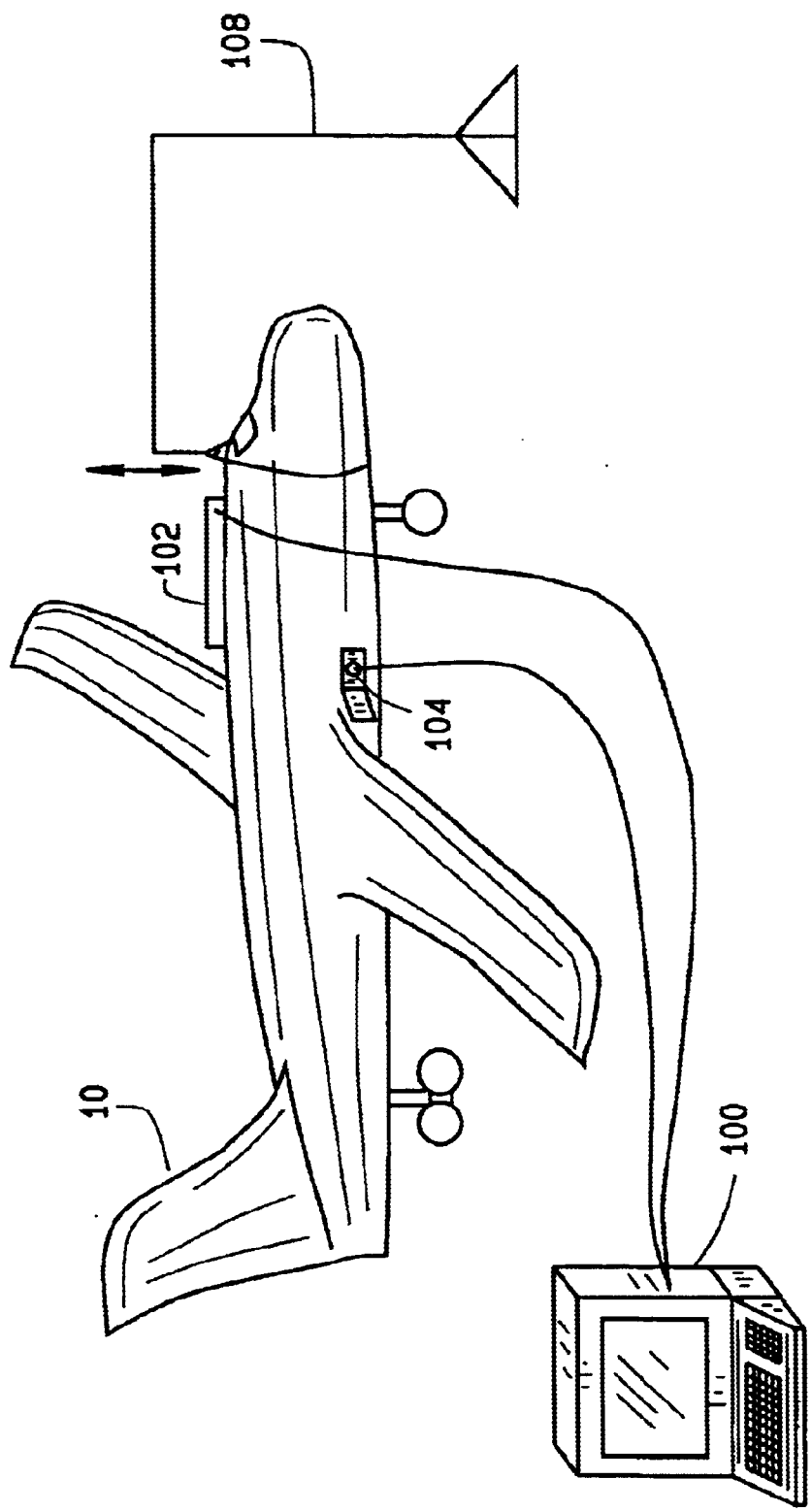
FIG. 4 is a diagram illustrating an IRU installation alignment system.

FIG. 4 is a diagram which illustrates a system configured to implement the above described uncompensated nose plunge installation alignment methods for aircraft 10. The system includes a computer 100 which communicates with an angular position measurement device 102 and one or more IRUs 104. A hoist 108 or other similar equipment, for example, a jack, is used to provide the nose plunge movement, in the single axis as described above. Angular position measurement device 102 and IRU 104 are configured to provide roll and pitch information to computer 100. Computer 100 is configured to determine, installation alignment corrections, Euler angle sets (with roll and pitch corrections), and yaw misalignment angles as described above. Further, computer is programmed to inform an operator if the misalignment corrections as determined are within the predetermined tolerances, for example, 0.01°. If not within the tolerances, computer 100 is configured to perform additional iterations of Euler angle determination and yaw misalignment angles, using computed correction until misalignment corrections are within the predetermined tolerances.

When misalignment corrections have been computed which are within the predetermined tolerances, computer 100 is configured to communicate the correction data, for example, roll, pitch, and yaw misalignment corrections, to a personality module (not shown) within aircraft 10 or other device utilizing attitude measuring equipment. In one embodiment, the personality module is contained within IRU 104.

While the invention has been described in terms of various specific embodiments, those skilled in the art will recognize that the invention can be practiced with modification within the spirit and scope of the claims.

What is claimed is:

1. A method for installation alignment of an inertial reference unit (IRU) with vehicle axes, the vehicle axes including roll, pitch, and yaw axes, said method comprising:

recording vehicle angular position data, including roll and pitch, using an angular position measurement device, the vehicle being in a starting position;

recording IRU data, including roll and pitch;

assuming a heading reference value, the assumed value to be included in both the vehicle angular position data and the recorded IRU data;

receiving measured nose plunge data;

computing initial roll and pitch misalignment corrections;

applying initial roll and pitch misalignment corrections to measured nose plunge data; and determining a nose plunge yaw misalignment using the measured nose plunge data to adjust the assumed heading reference.

2. A method according to claim 1 wherein receiving measured nose plunge data comprises:

moving a vehicle to a first nose plunge position;

recording IRU roll and pitch data at the first nose plunge position;

moving the vehicle to a second nose plunge position; and recording IRU roll and pitch data at the second nose plunge position.

3. A method according to claim 1 wherein recording IRU data comprises recording IRU data with the vehicle in the starting position.

4. A method according to claim 2 wherein moving the vehicle comprises moving the vehicle in a single axis.

5. A method according to claim 2 wherein computing initial roll and pitch misalignment corrections comprises computing misalignment corrections according to $DCM_{VEHICLE}^{DEVICE} = DCM^{DEVICE}(DCM^{VEHICLE})^{-1}$, where DCM is a direction cosine matrix created from a set of Euler angles, a device Euler angle set used to create $DCM^{DEVICE}$, is the IRU measurements made at the vehicle starting condition, a vehicle Euler angle set used to create $DCM^{VEHICLE}$, is the angular position measurement device measurements made at the vehicle starting condition, and a vehicle to device Euler angle set used to create $DCM_{VEHICLE}^{DEVICE}$, is a set of three desired installation misalignment corrections.

6. A method according to claim 2 wherein applying initial roll and pitch misalignment corrections to measured nose plunge data comprises correcting measurements according to $DCM^{NEW1} = (DCM^{MA})^{-1} \times DCM^{OLD1}$ and $DCM^{NEW2} = (DCM^{MA})^{-1} \times DCM^{OLD2}$, where DCM is a direction cosine matrix created from a set of Euler angles, the Euler angle set OLD1 is $(\phi_1, \theta_1, 0)$, which are IRU measurements with an assumed zero heading at the first nose plunge position, the Euler angle set OLD2 is $(\phi_2, \theta_2, 0)$, which are IRU measurements with an assumed zero heading at the second nose plunge position, the Euler angle set MA is ($\phi_{MA}$, $\theta_{MA}$, 0), which are roll and pitch misalignment corrections, and the Euler angle sets NEW1 and NEW2 which are corrected nose plunge measurements.

7. A method according to claim 6 wherein new heading angles as calculated in each of NEW1 and NEW2 Euler angle sets are unused when determining installation misalignment corrections.

8. A method according to claim 6 wherein applying Euler angles to recorded nose plunge data comprises applying roll and pitch corrections to the measured nose plunge data to provide corrected nose plunge data.

9. A method according to claim 6 wherein determining a nose plunge yaw misalignment comprises computing a nose plunge yaw misalignment according to $\Delta\Psi = \tan^{-1}\{(\cos\theta_2 \sin\phi_2 - \cos\theta_1 \sin\phi_1)/(\sin\theta_2 - \sin\theta_1)\}$, where $\Delta\Psi$ is a computed vehicle to IRU yaw misalignment angle, $\theta_1$ is a measured initial IRU pitch angle, $\theta_2$ is a measured final IRU pitch angle, $\phi_1$ is a measured initial IRU roll angle, and $\phi_2$ is a measured final IRU roll angle.

10. A method according to claim 9 further comprising using the computed yaw misalignment to adjust the assumed heading reference.

11. A method according to claim 10 wherein adjusting the assumed heading reference comprises subtracting the computed yaw misalignment from the measured heading.

12. A method according to claim 1 further comprising checking misalignment corrections to determine if the corrections in roll, pitch, and yaw are all less than a predetermined value.

13. A method according to claim 12 wherein the predetermined value is 0.01°.

14. An apparatus configured for installation alignment of an inertial reference unit (IRU) with vehicle roll, pitch, and yaw axes comprising:

a vehicle angular position measurement device; and a computer configured to be coupled to said angular position measurement device, said computer further configured to be coupled to the IRU, said computer configured to record a starting condition of the vehicle in the roll and pitch axes, the vehicle being in a starting position, through data received from said angular position measurement device, record IRU data including roll and pitch received from the IRU at the starting position, assume a single heading value for both said angular position measurement device data and the IRU data, record IRU data including roll, pitch, and heading received from the IRU at multiple nose plunge positions, compute initial roll and pitch misalignment corrections, apply initial roll and pitch misalignment corrections to data received from the IRU at the multiple nose plunge positions, and determine a nose plunge yaw misalignment using the IRU data from the multiple nose plunge positions to adjust the heading value.

15. An apparatus according to claim 14 wherein said computer is configured to communicate roll, pitch, and yaw misalignment corrections to a personality module.

16. An apparatus according to claim 15 wherein said computer is configured to record IRU personality module data.

17. An apparatus according to claim 14 wherein said computer is configured to compute misalignment corrections according to $DCM_{VEHICLE}^{DEVICE} = DCM^{DEVICE}(DCM^{VEHICLE})^{-1}$, where DCM is a direction cosine matrix created from a set of Euler angles, a device Euler angle set used to create, $DCM^{DEVICE}$, is the IRU read out during the vehicle starting condition, a vehicle Euler angle set used to create, $DCM^{VEHICLE}$, is the angular position measurement device measurement made during the vehicle starting condition, and a vehicle to device Euler angle set used to create, $DCM_{VEHICLE}^{DEVICE}$, is a set of three desired installation misalignment corrections.

18. An apparatus according to claim 15 wherein said computer is configured to apply initial roll and pitch misalignment corrections to measured IRU data according to $DCM^{NEW1} = (DCM^{MA})^{-1} \times DCM^{OLD1}$ and $DCM^{NEW2} = (DCM^{MA})^{-1} \times DCM^{OLD2}$, where DCM is a direction cosine matrix created from a set of Euler angles, the Euler angle set OLD1 is ($\phi_1$, $\theta_1$, 0), which are IRU measurements at a first nose plunge position with an assumed zero heading, the Euler angle set OLD2 is ($\phi_2$, $\theta_2$, 0), which are IRU measurements at a second nose plunge position with an assumed zero heading, the Euler angle set MA is ($\phi_{MA}$, $\theta_{MA}$, 0), which are roll and pitch misalignment corrections, and the Euler angle sets NEW1 and NEW2 which are corrected nose plunge measurements.

19. An apparatus according to claim 18 wherein said computer is configured to ignore newly calculated heading angles which are calculated in each of the NEW1 and NEW2 Euler angle sets.

20. An apparatus according to claim 18 wherein said computer is configured to apply roll and pitch corrections to measured IRU data to provide corrected nose plunge data.

21. An apparatus according to claim 20 wherein said computer is configured to compute a nose plunge yaw misalignment using the corrected nose plunge data according to $\Delta\Psi = \tan^{-1}\{(\cos\theta_2 \sin\phi_2 - \cos\theta_1 \sin\phi_1)/(\sin\theta_2 - \sin\theta_1)\}$, where $\Delta\Psi$ is a computed vehicle to IRU yaw misalignment angle, $\theta_1$ is a pitch angle measured by the IRU at a first nose plunge position, $\theta_2$ is a pitch angle measured by the IRU at a second nose plunge position, $\phi_1$ is a roll angle measured by the IRU at the first nose plunge position, and $\phi_2$ is a pitch angle measured by the IRU at the second nose plunge position.

22. An apparatus according to claim 21 wherein said computer is configured to adjust an assumed heading reference by subtracting the computed yaw misalignment from the measured heading.

23. An apparatus according to claim 14 wherein said computer is configured to verify whether computed misalignment corrections in roll, pitch, and yaw are all less than a predetermined value.

24. A method for installation alignment of an inertial reference unit (IRU) within a unit, the unit having roll, pitch, and yaw axes, said method comprising:

recording roll and pitch of the unit, using an angular position measurement device, the unit being in an arbitrary starting position;

recording roll and pitch of the unit using the IRU;

assuming a heading reference value for the unit, the assumed value to be included in both the angular position device data and the recorded IRU data;

rotating the unit in a single axis to a first position;

recording roll and pitch of the unit using the IRU;

rotating the unit in the same single axis to a second position;

recording roll and pitch of the unit using the IRU;

computing initial roll and pitch misalignment corrections;

applying initial roll and pitch misalignment corrections to measured IRU data from the first position and the second position; and determining a yaw misalignment for the unit using the measured IRU data to adjust the assumed heading reference.

* * * * *